United States Patent Office 3,686,201
Patented Aug. 22, 1972

3,686,201
1,2,4-TRIAZOLYL-IMINODITHIOCARBONIC ACID ESTERS
Karlfried Dickoré, Richard Wegler, and Günther Hermann, Leverkusen, Germany, assignors to Farbenfabriken Bayer Aktiengesellschaft, Leverkusen, Germany
No Drawing. Filed July 17, 1969, Ser. No. 842,701
Claims priority, application Germany, July 19, 1968,
P 17 70 920.5
Int. Cl. C07d 55/06
U.S. Cl. 260—308 R  5 Claims

ABSTRACT OF THE DISCLOSURE 1,2,4-triazolyl-iminodithiocarbonic acid esters; i.e. N-(1,2,4-triazol-3-yl)-iminodithiocarbonic acid mono and di (same and mixed) -alkyl, alkenyl, alkynyl, alkylmercapto-alkyl and phenyl-alkyl esters; or N-(1,2,4-triazol-3-yl)-dithiocarbamic acid alkyl, alkenyl, alkynyl, alkylmercapto-alkyl and phenyl-alkyl esters and N-(1,2,4-triazol-3-yl)-iminodithiocarbonic acid di (same and mixed) -alkyl, alkenyl, alkynyl, alkylmercapto-alkyl and phenylalkyl esters; which possess rodent-, leporine animal- and ruminant-repellent properties, and which may be produced by conventional methods.

The present invention relates to and has for its objects the provision for particular new 1,2,4-triazolyl-iminodithiocarbonic acid esters; i.e. N-(1,2,4-triazol-3-yl)-iminodithiocarbonic acid mono and di (same and mixed) -alkyl, alkenyl, alkynyl, alkylmercapto-alkyl and phenyl-alkyl esters; or N-(1,2,4-triazol-3-yl)-dithiocarbamic acid alkyl, alkenyl, alkynyl, alkylmercapto-alkyl and phenyl-alkyl esters and N-(1,2,4-triazol - 3 - yl)-iminodithiocarbonic acid di (same and mixed) -alkyl, alkenyl, alkynyl, alkylmercapto-alkyl and phenyl-alkyl esters; which possess rodent-, leporine animal- and ruminant-repellent properties, active compositions in the form of mixtures of such compounds with solid and liquid dispersible carrier vehicles, and methods for producing such compounds and for using such compounds in a new way, especially for repelling warm-blooded creatures such as rodents, leporine animals and ruminants, and the like, with other and further objects becoming apparent from a study of the within specification and accompanying examples.

It is already known that zinc dimethyldithiocarbamate (A) and tetramethylthiouramdisulfide (B) can be used for repelling rodents, leporine animals and ruminants. These two active compounds have attained a considerable importance in commercial practice.

It has now been found, in accordance with the present invention, that the particular new 1,2,4-triazolyliminodithiocarbonic acid esters of the formula

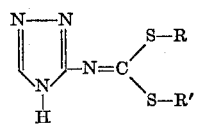

(I)

in which

R is alkyl of 1–12 carbon atoms, alkenyl of 2–4 carbon atoms, alkynyl of 2–4 carbon atoms, alkylmercapto-alkyl having 1–4 carbon atoms in the alkyl mercapto moiety and 1–4 carbon atoms in the alkyl moiety, or phenyl-alkyl having 1–4 carbon atoms in the alkyl moiety, and R' is hydrogen, or R, exhibit a distinct repellent effect against rodents, leporine animals and ruminants.

It has further been found, in accordance with the present invention, that the production of the compounds of Formula I above may be provided by the process which comprises reacting 3-amino-1,2,4-triazole of the formula

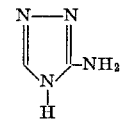

(II)

in the presence of alkali metal hydroxide, with carbon disulfide to form the alkali metal salt of N-(1,2,4-triazol-3-yl)-iminodithiocarbonic acid of the formula

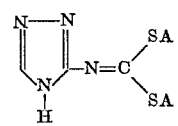

(III)

in which A represents an alkali metal cation such as sodium, potassium, and the like, and this salt is subsequently reacted with an alkylating agent (IV).

For the alkylation there are three possibilities in principle:

(1) The monoester is prepared. In this connection, it is important that the monoester is subject to a tautomerism according to the following formula scheme:

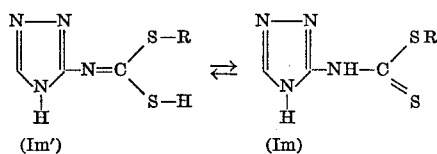

(Im')  (Im)

In accordance with the present invention, the formula used in each case herein is meant to denote both tautomeric limiting states consonant with the foregoing.

(2) The diester is prepared. In this case, both ester radicals are identical.
(3) First the monoester is prepared and, from this, the diester is prepared. In this case, mixed esters can be prepared.

Surprisingly, the repellent effect of the active compounds of Formula I above according to the present invention is higher than that of the known rodent and ruminant repellents zinc dimethyldithiocarbamate (A) and tetramethylthiouramdisulfide (B). The new compounds of the present invention therefore represent a valuable contribution to the art.

Advantageously, in accordance with the present invention, in the various formulae herein:

R represents straight and branched chain alkyl hydrocarbon of 1–12 carbon atoms such as methyl, ethyl, n- and iso-propyl, n-, iso-, sec.- and tert.-butyl, n-amyl, 1-, 2- and 3-methyl-n-butyl, 1-ethyl-n-propyl, 1,1- and 1,2-dimethyl-n-propyl, n-hexyl, iso-hexyl, heptyl, octyl, nonyl, decyl, undecyl, dodecyl, and the like, especially lower or $C_{1-4}$ or $C_{1-3}$ or $C_{1-2}$ alkyl, and more especially straight chain lower alkyl;

straight and branched chain lower alkenyl hydrocarbon of 2–4 carbon atoms such as α-, β- and γ-allyl (i.e. prop-2-enyl, 1-methyl-vinyl and prop-1-enyl), but-1,2 and 3-enyl, and the like, especially $C_3$ alkenyl, more especially straight chain $C_3$ alkenyl, and most especially allyl, e.g. α-allyl or prop-2-enyl;

straight and branched chain lower alkynyl hydrocarbon of 2–4 carbon atoms such as acetylenyl, prop-2 and 1-ynyl, but-3,2 and 1-ynyl, and the like, especially $C_3$ alkynyl, more especially straight chain $C_3$ alkynyl, and most especially propargyl, i.e. prop-2-ynyl;

alkylmercapto-alkyl having 1–4 carbon atoms in the corresponding alkylmercapto moiety and having 1–4 carbon atoms in the corresponding alkyl moiety such as methyl to tert.-butyl inclusive, as defined above, and the like, -mercapto substituted methyl, eth-1 and 2-yl, prop-1,2 and 3-yl, but-1,2,3 and 4-yl, 2-methyl-propyl, 1,1-dimethyl-ethyl, 2,2-dimethyl-ethyl and the like, i.e. $C_{1-4}$ alkylmercapto-$C_{1-4}$ alkyl, especially $C_{1-4}$ or $C_{1-3}$ or $C_{1-2}$ alkylmercapto-$C_{1-4}$ or $C_{1-3}$ or $C_{1-2}$ alkyl, more especially straight chain $C_{1-4}$ or $C_{1-3}$ or $C_{1-2}$ alkylmercapto- straight ch$_n$ in $C_1$–$C_4$ or $C_1$–$C_3$ or $C_1$–$C_2$ alkyl, and most especially β-ethylmercapto-ethyl; or phenyl-alkyl having 1–4 carbon atoms in the alkyl moiety such as phenyl-substituted methyl, ethyl, n- and iso-propyl, n-, iso-, sec.- and tert.-butyl, and the like, i.e. phenyl-$C_{1-4}$ alkyl, especially phenyl $C_{1-3}$ or $C_{1-2}$ alkyl, more especially phenyl-substituted straight chain $C_{1-4}$ or $C_{1-3}$ or $C_{1-2}$ alkyl, and most especially phenyl-methyl, i.e. benzyl; and R' represents hydrogen; or
R as defined above.

Preferably, R is $C_{1-12}$ or $C_{1-4}$ alkyl; or $C_{2-4}$ alkenyl; or $C_{2-4}$ alkynyl; or $C_{1-2}$ alkylmercapto-$C_{1-2}$ alkyl; or phenyl-$C_{1-2}$ alkyl; and R' is hydrogen; or R as defined above; and preferably hydrogen.

In particular, R is $C_{1-12}$ or $C_{1-4}$ alkyl; or $C_3$ alkenyl; or $C_3$ alkynyl; or $C_{1-2}$ alkylmercapto-$C_{1-2}$ alkyl; or benzyl; and R' is hydrogen; or $C_{1-12}$ or $C_{1-4}$ alkyl; or $C_3$ alkenyl; or $C_{1-2}$ alkylmercapto-$C_{1-2}$ alkyl; or benzyl; R' preferably being hydrogen.

The first step of the production reaction can be represented by the following formula scheme:

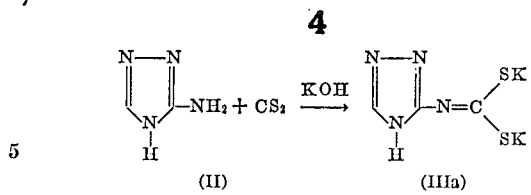

This reaction is preferably carried out in the presence of inert polar solvents, such as water, dimethyl formamide, dimethyl sulfoxide, N-methyl-pyrrolidone and tetramethylenesulfone. Particularly suitable are solvents with a dielectric constant of more than 20.

As alkali metal hydroxide, preferably potassium hydroxide and sodium hydroxide are usable.

The first step reaction can be carried out within a fairly wide temperature range. In general, the reaction temperature is substantially between about 20–100° C., and preferably between about 50–80° C.

When carrying out the first step reaction, two mols of alkali metal hydroxide, and expediently an excess of carbon disulfide, are used to one mol of 3-amino-1,2,4-triazole. Isolation of the reaction product takes place in customary manner, e.g. by concentration of the solution and crystallizing out the product. The reaction mixture may, however, also be used directly for the second reaction step.

If dipotassium - N - (1,2,4-triazol-3-yl)-iminodithiocarbonate and benzyl chloride are used for the second reaction step, the reaction course thereof can be represented by the following formula scheme:

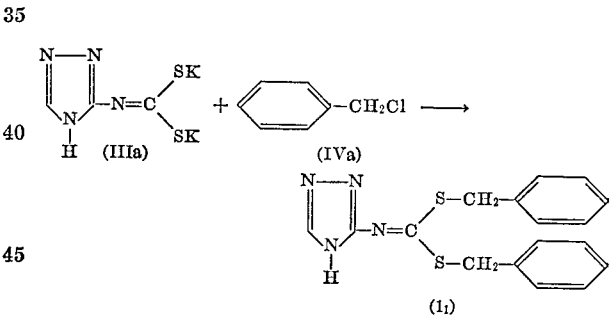

The second step alkylation is carried out in the customary manner with the usual alkylating agents. For this purpose, preferably used are alkyl sulfates, alkyl halides, phenyl-alkyl halides, alkenyl halides and alkynyl halides, which may be substituted in the desired manner.

As examples of the alkylating agents which can be used according to the present invention, there are mentioned in particular: dimethyl sulfate, methyl bromide, diethyl sulfate, allyl chloride, but-3-ynyl chloride, allyl bromide, propargyl chloride, dodecyl iodide, ethylmercapto-ethyl chloride, crotyl bromide, benzyl chloride, and the like.

The second step alkylation is expediently carried out in the presence of water. However, polar organic solvents may also be present, e.g. those which have been used in the first reaction step. In addition, further water-miscible solvents are suitable, such as alcohol and acetone.

The second step reaction temperatures may vary within the usual ranges and depend essentially on the activity of the alkylating agent. Such temperatures, in general, are substantially between about 0–100° C.

If it is desired to prepare a monoester, up to one mol of alkylating agent is used to one mol of dithiocarbonic acid, whereas if it is desired to prepare a diester, it is expedient to use at least two mols of alkylating agent per one mol of dithiocarbonic acid, as the artisan will appreciate. The working up is carried out in customary manner, e.g. by precipitation and recrystallization. If it is desired to prepare mixed diesters, the monoester is first prepared using one alkylating agent, and such monoester is subsequently converted into the desired mixed diester with a different alkylating agent.

Advantageously, the active compounds according to the present invention possess, with low toxicity to warm-blooded animals, as well as low phytotoxicity, a pronounced repellent effect against destructive leporine animals (Lagomorpha) and rodents (Rodentia), such as squirrel-like animals (Sciuroidae), gophers (Geomyoidae) and mouse-like animals (Muroidae) with which there are classed essentially the dormouse-like animals (Muscardinidae) and the mice (Muridae); and the like.

The leporine animals contemplated herein include essentialy the Leporidae, such as the rabbit (*Oryctolagus cuniculus*), the squirrel-like animals include for example the European souslik (*Citellus citellus*) and the ground squirrel (*Citellus lateralis*), and the gophers include for example the mountain pocket gopher (*Thomomys talpoides*); and the like. With the dormouse-like animals contemplated herein there is classed for example the fat dormouse (*Glis glis*), and the like, whereas the mice contemplated herein comprise essentially, in the group of the long-tailed mice (Murinae), the rats (Rattus spec.), such as the black rat (*Rattus rattus*) and the Norway rat (*Rattus norvegicus*); the house mice (Mus spec.), such as *Mus musculus*; in the group of the hamster-like animals (Cricetinae) the European hamster (*Cricetus cricetus*); and, in the group of the short-tailed mice (Microtinae) for example the common vole (*Microtus arvalis*), the field vole (*Microtus agrestis*) and the water vole (*Arvicola terrestris*); and the like.

The active compounds according to the present invention also repel destructive ruminants (Ruminantia), the most important groups of which are the deer (Cervidae) and the horned animals (Bovidae), and the like.

With the deer contemplated herein are classed for example the roe deer (*Capreolus capreolus*), the Virginia deer (*Odocoileus* spec.), the fallow deer (*Dama dama*), the wapiti (*Cervus canadensis*) and the red deer (*Cervus elaphus*), and the like. Among the horned animals contemplated herein, there belong to the group of the chamois-like animals (Rupicaprinae) particularly the sheep (*Ovis* spec.) and goats (*Capra* spec.), and the like.

The active compounds according to the instant invention can be utilized, if desired, in the form of the usual formulations or compositions with conventional inert (i.e. plant compatible or herbicidally inert) pesticidal (or pest- or warm-blooded creature-repellent) diluents or extenders, i.e. diluents or extenders of the type usable in conventional pesticidal formulations or compositions, e.g. conventional pesticidal (or pest- or warm-blooded creature-repellent) dispersible carrier vehicles, such as solutions, emulsions, suspensions, emulsifiable concentrates, spray powders, pastes, soluble powders, dusting agents, granule, etc. There are prepared in known manner, for instance by extending the active compounds with conventional pesticidal (or pest- or warm-blooded creature-repellent) dispersible liquid diluent carriers and/or dispersible solid carriers optionally with the use of carrier vehicle assistants, e.g. conventional pesticidal (or pest- or warm-blooded creature-repellent) surface active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons e(.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other repellents, or nematocides, acaricides, insecticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.01–95%, and preferably 0.05–80%, by weight of the mixture. Thus, the present invention contemplates overall compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.01–95%, and preferably 0.01–80%, by weight of the mixture.

The active compounds can also be used in accordance with the well-known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

In particular, the present invention contemplates methods of repelling warm-blooded creatunes or animals, i.e. pests, and specifically rodents, leporine animals and ruminants, which comprise applying to the area, material, place, and the like, from which such warm-blooded creatures are to be repelled, i.e. the locus to be protected or any and all things or matter which are susceptible to damage by (e.g. by eating, gnawing, biting, trampling, etc.) and/or from which such pest creatures are to be repelled, a correspondingly repellent effective amount, i.e. a warm-blooded creasure repellent effective amount, of the particular active compound of the invention alone or together with a carrier vehicle as noted above. The instant formulations or compositions are applied in the usual manner, for instance by spraying, atomizing, vaporizing, squirting, scattering, dusting, watering, sprinkling, pouring, and the like.

More specifically, application of the active compounds according to the present invention, their formulations and the application forms prepared therefrom is effected in the normal way, e.g. by seed treatment, by spraying, dusting or scattering of suitable preparations of the active compound on plants or parts of plants endangered or jeopardized by rodent damage and/or damage by ruminants (including damage by game), by soil treatment, by fumigation in rooms or subterranean structures, by above-ground or underground application of repellent coatings and barriers and by impregnation of materials which may be endangered or jeopardized by rodents and/or ruminants, such as wood, paper, rubber and synthetic materials.

For seed treatment, e.g. seed dressing, in general substantially between about 0.01–5 parts, preferably between about 0.025–1 part, by weight of active compound are used per 100 parts by weight of seed, e.g. in g. per 100 g. of seed, i.e. plantable or agricultural crop seed—regardless of the presence or absence of such carrier vehicle.

Spray liquors or pastes usable for the achievement of rodent-repellent and ruminant-repellent coatings, e.g. on endangered or jeopardized plants or parts of plants, contain, in general, substantially between about 0.1–20%, and preferably between about 0.5–10%, by weight of active compound. Materials which are soaked with the active compounds should have in the surface layer thereof a concentration of active compound of substantially between about 0.1–5% by weight.

It will be realized, of course, that the concentration of the particular active compound utilized in admixture with the carrier vehicle or seed may vary within a fairly wide range and will depend upon the intended application as the artisan will appreciate. Therefore, in special cases it is possible to go above or below the aforementioned concentration ranges.

The outstanding effectiveness of the particular compounds usable according to the present invention is illustrated, without limitation, by the following examples.

EXAMPLE 1

Repellent test: deer mouse

Test animal: North American white-footed mouse (*Peromyscus maniculatus*)
Solvent: acetone
Concentration of active compound in test food: 2%

To prepare a suitable preparation of the particular active compound, 2 parts by weight of such active compound are dissolved in as small as possible an amount of the solvent stated above, the resulting solution is mixed intimately with 98 parts by weight of wheat seed, and the solvent is allowed to evaporate so as to form treated wheat seed grains.

5 individually kept deer mice receive, on each of 3 successive days, besides a disliked standard food, in each case 25 treated grains of wheat. The number of grains eaten by each animal is recorded daily.

As a measure of the repellent effect, there serves the reduction of food intake, i.e. the percentage by which the actual feeding (as a percentage of the total amount of wheat offered) is lessened with respect to the 100% feeding always to be expected in the case of untreated wheat. 100% reduction of food intake denotes that no wheat grains at all have been eaten, the repellent effect therefore being total. The values stated comprise the feeding result of all test animals during the entire experiment.

The particular active compounds tested, the number of individual tests and the results obtained can be seen from the following Table 1:

TABLE 1.—REPELLENT TEST: DEER MOUSE

| Active compound | Number of individual tests | Reduction of food intake in percent |
|---|---|---|
| (A) Zinc dimethyldithiocarbamate (known) | 1 | 31.5 |
| ($2_1$) $\begin{array}{c}\text{N}\text{—}\text{N}\\ \text{‖ ‖}\\ \phantom{xx}\text{—NH—C—S CH}_3\\ \text{NH}\phantom{xxxxx}\text{S}\end{array}$ | 1 | 94.9 |
| ($3_1$) $\begin{array}{c}\text{N}\text{—}\text{N}\\ \text{‖ ‖}\\ \phantom{xx}\text{—NH—C—S—CH}_2\text{—CH=CH}_2\\ \text{NH}\phantom{xxxxx}\text{S}\end{array}$ | 1 | 88.3 |
| ($4_1$) $\begin{array}{c}\text{N}\text{—}\text{N}\phantom{xxx}\text{S CH}_3\\ \text{‖ ‖}\phantom{xxx}/\\ \phantom{xx}\text{—N=C}\\ \text{NH}\phantom{xxxx}\backslash\text{S CH}_3\end{array}$ | 1 | 95.2 |
| ($5_1$) $\begin{array}{c}\text{N}\text{—}\text{N}\phantom{xxx}\text{S—CH}_3\\ \text{‖ ‖}\phantom{xxx}/\\ \phantom{xx}\text{—N=C}\\ \text{NH}\phantom{xxxx}\backslash\text{S—CH}_2\text{—CH=CH}_2\end{array}$ | 1 | 86.1 |

EXAMPLE 2

Repellent test: house mouse

Test animal: white laboratory mouse (*Mus musculus*)
Concentration of active compound in test food: 0.5%

To produce a suitable preparation of the particular active compound, 3 parts by weight of such active compound are mixed with 2.8 parts by weight of highly dispersed silicic acid and 4.2 parts by weight of talc. To prepare the test bait, 1.67 parts by weight of the resulting active compound concentrate are intimately mixed with 95 parts by weight of a standard mealy food customary for feeding experimental animals, with the addition of 3.33 parts by weight of methyl cellulose and a little water. From 6 g. of the resulting dry substance, two spherical bait pellets are formed which are dried at room temperature for 24 hours before commencement of the experiment.

These pellets are placed for 24 hours, without other food, before two white laboratory mice kept together. Water is freely available. The residues of the pellets are dried and weighed again after the experiment has ended.

The residual amount, expressed as a percentage of the amount originally used, is valid as a measure of the repellent effect. Thus, 100% repellent effect means that nothing at all of the pellets has been eaten.

The particular active compounds tested, the number of experiments and the results obtained can be seen from the following Table 2:

TABLE 2.—REPELLENT TEST: HOUSE MOUSE

| Active compound | | Number of individual tests | Repellency in percent (average value) |
|---|---|---|---|
| (B) | Tetramethylthiouramdisulfide (known) | 3 | 67.8 |
| ($2_2$) | [pyrazole]-NH-C(=S)-S-CH$_3$ | 3 | 91.3 |
| ($6_1$) | [pyrazole]-NH-C(=S)-S-C$_2$H$_5$ | 1 | 100 |
| ($7_1$) | [pyrazole]-NH-C(=S)-S-CH$_2$-CH$_2$-S-C$_2$H$_5$ | 1 | 90.0 |
| ($3_2$) | [pyrazole]-NH-C(=S)-S-CH$_2$-CH=CH$_2$ | 3 | 88.9 |
| ($8_1$) | [pyrazole]-NH-C(=S)-S-CH$_2$-C$_6$H$_5$ | 1 | 100 |
| ($4_2$) | [pyrazole]-N=C(S-CH$_3$)(S-CH$_3$) | 3 | 76.7 |
| ($9_1$) | [pyrazole]-N=C(S-C$_2$H$_5$)(S-C$_2$H$_5$) | 1 | 90.0 |
| ($5_2$) | [pyrazole]-N=C(S-CH$_3$)(S-CH$_2$-CH=CH$_2$) | 3 | 83.3 |
| ($10_1$) | [pyrazole]-N=C(S-CH$_2$-CH=CH$_2$)(S-CH$_2$-CH=CH$_2$) | 3 | 75.6 |
| ($11_1$) | [pyrazole]-N=C(S-CH$_3$)(S-CH$_2$-C≡CH) | 1 | 90.0 |
| ($12_1$) | [pyrazole]-N=C(S-CH$_3$)(S-CH$_2$-C$_6$H$_5$) | 1 | 90.0 |
| ($1_2$) | [pyrazole]-N=C(S-CH$_2$-C$_6$H$_5$)(S-CH$_2$-C$_6$H$_5$) | 1 | 80.0 |

EXAMPLE 3

Open-air enclosure test: black-tailed deer

Test animal: black-tailed deer (*Odocoileus columbianus*)

To produce a suitable preparation of the particular active compound, 6 parts by weight of such active compound and 10 parts by weight of a copolymer of methyl methacrylate and butadiene as adhesion promoter are dispersed in 84 parts by weight of water. Two-year-old Douglas fir seedlings (*Pseudotsuga taxifolia*) 18–30 cm. high are totally immersed in the given preparation of active compound. After drying, the plants are covered all over with a thin layer of the adhesive containing the active compound and planted in a game enclosure of 1.01 hectares. Inside the open-air enclosure area, ten test plots are laid out in each of which there are twenty seedlings which are treated with the given active compound, twenty seedlings which are treated with the standard agent tetramethylthiouramdisulfide (TMTD) and twenty seedlings which are untreated and which serve as control.

The game enclosure is now occupied by ten black-tailed deer. The test proceeds until intermediate checks show a damage of 60–80% in the case of the untreated seedlings. Then the average degree of damage is determined. 100 means that all the seedlings have been damaged, whereas 0 means that none of the seelings have been damaged.

The particular active compounds tested, the dosage, the number of treated seedlings and the average degrees of damage can be seen from the following Table 3.

TABLE 3.—OPEN-AIR ENCLOSURE TEST: BLACK-TAILED DEER

| Active compound | Dosage of active compound in the treatment medium in percent | Number of treated seedlings | Average degree of damage |
| --- | --- | --- | --- |
| Untreated control | | 200 | 74.87 |
| (B) Tetramethylthiouramdisulfide (known) | 6 | 200 | 47.91 |
| (5₃) 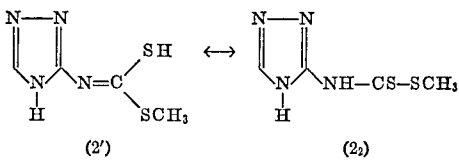 | 6 | 200 | 26.97 |

EXAPLE 4

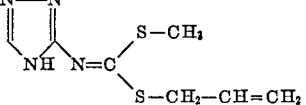

(2')          (2₂)

(a) To a solution of 170 g. 3-amino-1,2,4-triazole in 500 ml. dimethyl formamide there are added 132 ml. carbon disulfide, and then a solution of 224 g. potassium hydroxide in 160 ml. of water is added dropwise thereto, with stirring and occasional cooling. The temperature of the reaction mixture is kept at 50° C. for three hours and then at 80° C. for four hours. The brown reaction solution is diluted with 2 liters of water, and 190 ml. dimethyl sulfate as alkylating agent are then added dropwise. The separation of the partially precipitated reaction product is completed by addition of 100 ml. acetic acid; suction filtration is effected, followed by washing with water and then twice with methanol. 157 g. N-(1,2,4-triazol-3-yl)-dithiocarbamic acid methyl ester are obtained as colorless crystal powder, M.P. >360° C. (higher than 360° C.).

(b) When, without dilution with water and without alkylation, the brown reaction solution obtained above is concentrated somewhat by evaporation and then cooled to 0° C., the yellow bis-potassium salt of N-(1,2,4-triazol-3-yl)-iminodithiocarbonic acid precipitates. After suction filtration, and washing with cold dimethyl formamide and then with acetone, 218 g. of the readily water-soluble salt are obtained.

(c) For characterization, the colors of the following sparingly soluble heavy-metal salts which can readily be prepared from the corresponding dipotassium salt in the well-known manner by double reaction are set forth below:

Zn salt—pale yellow
        Cu salt—black
        Pb salt—brownish-yellow
        Cd salt—pale yellow
        Mn salt—orange-yellow
        Co salt—olive-brown In analogous manner, there are also prepared:
N-(1,2,4-triazol-3-yl)-dithiocarbamic acid ethyl ester:

(6₂) 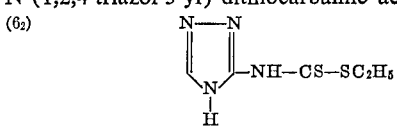

M.P. 202° C.

N-(1,2,4-triazol-3-yl)-dithiocarbamic acid β-ethylmercapto-ethyl ester:

(7₂) 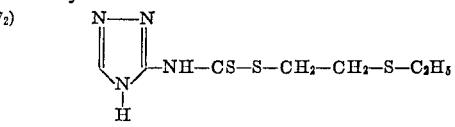

M.P. 195° C.

N-(1,2,4-triazol-3-yl)-dithiocarbamic acid benzyl ester:

(8₂) 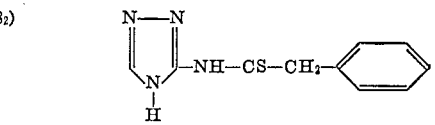

M.P. 200° C.

(3₃) N-(1,2,4-triazyl-3-yl)-dithiocarbamic acid prop-2'-enylester

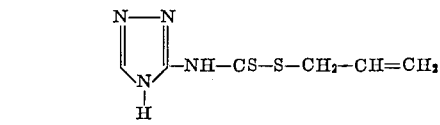

M.P. 184° C. (decomp.)

EXAMPLE 5

(1₃) 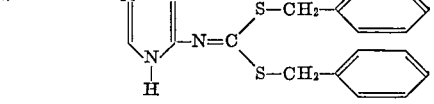

To a solution, in 100 ml. of water, of 23.6 g. of the bis-potassium salt (prepared according to Example 4b) of N-(1,2,4-triazol-3-yl)-iminodithiocarbonic acid there are added 25.4 g. benzyl chloride and stirring is effected for one hour at 50° C. After suction filtration and washing with water, 29.0 g. N-(1,2,4-triazol-3-yl)-iminodithiocarbonic acid dibenzyl ester are obtained which, after recrystallization from chloroform-petroleum ether, melts at 135° C.

In analogous manner, there are also obtained:
N-(1,2,4-triazol-3-yl)-iminodithiocarbonic acid dimethyl ester:

(4₃) 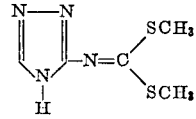

M.P. 152° C.

N-(1,2,4-triazol-3-yl)-iminodithiocarbonic acid di-n-dodecyl ester:

(13₁)
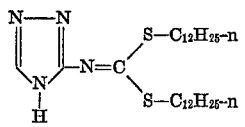

M.P. 40° C.

N-(1,2,4-triazol-3-yl)-iminodithiocarbonic acid di-prop-2'-enyl ester:

(10₂)
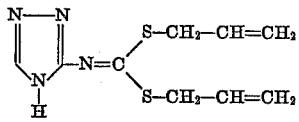

M.P. 76° C.

N-(1,2,4-triazol-3-yl)-iminodithiocarbonic acid di-(β-ethylmercapto-ethyl) ester:

(14₁)
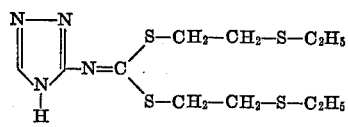

M.P. 74° C.

EXAMPLE 6

(11₂)
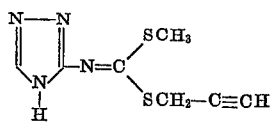

18.4 g. of the N-(1,2,4-triazol-3-yl)-dithiocarbamic acid methyl ester described in Example 4a are dissolved in 100 ml. of water with 10 ml. of 10 N solution of sodium hydroxide and, after addition of 7.5 g. propargyl chloride, stirred at 50° C. for 2½ hours. After suction filtration and washing with water, 16.2 g. N-(1,2,4-triazol-3-yl)-iminodithiocarbonic acid methylprop-2'-enyl ester are obtained. After recrystallization from chloroform/petroleum ether, such compound melts at 138° C.

In analogous manner, there are also obtained:

N - (1,2,4-triazol-3-yl) - iminodithiocarbonic acid methyl prop-2'-enyl ester:

(5₄)
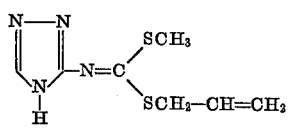

M.P. 84° C.

N - (1,2,4-triazol-3-yl) - iminodithiocarbonic acid methyl benzyl ester:

(12₂)
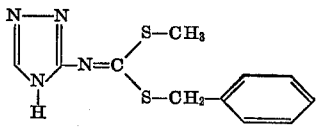

M.P. 103° C.

The following compounds are similarly produced:

(9₂) N-(1,2,4-triazol-3-yl)-iminodithiocarbonic acid diethyl ester

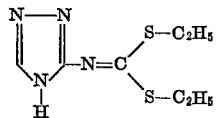

M.P. 132–134° C.

It will be realized that all of the foregoing compounds contemplated by the present invention possess the desired warm-blooded creature or animal repellent properties for repelling rodents, leporine animals and ruminants, and that such compounds have not only a very slight toxicity toward warm-blooded creatures, but also a concomitantly low phytotoxicity.

It will be appreciated that the instant specification and examples are set forth by way of illustration and not limitation, and that various modifications and changes may be made without departing from the spirit and scope of the present invention.

What is claimed is:

1. 1,2,4-triazolyl-iminodithiocarbamic acid ester of the formula

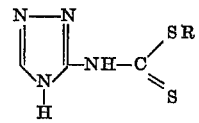

in which R is selected from the group consisting of alkyl of 1–4 carbon atoms, alkenyl of 3 carbon atoms, alkylmercapto-alkyl having 1–2 carbon atoms in the alkylmercapto moiety and 1–2 carbon atoms in the alkyl moiety, and phenyl-alkyl having 1–2 carbon atoms in the alkyl moiety.

2. Compound according to claim 1 wherein such compound is N-(1,2,4-triazol-3-yl)-dithiocarbamic acid methyl ester of the formula

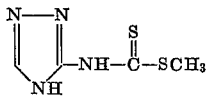

3. Compound according to claim 1 wherein such compound is N-(1,2,4-triazol-3-yl)-dithiocarbamic acid prop-2'-enyl ester of the formula

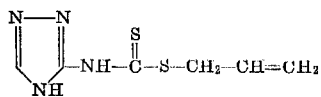

4. Compound according to claim 1 wherein such compound is N-(1,2,4-triazol-3-yl)-dithiocarbamic acid β-ethylmercapto-ethyl ester of the formula

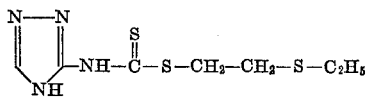

5. Compound according to claim 1 wherein such compound is N-(1,2,4-triazol-3-yl)-dithiocarbamic acid benzyl ester of the formula

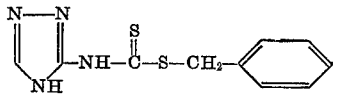

References Cited

UNITED STATES PATENTS 3,132,150   5/1964   Hopkins et al. _____ 260—308
3,345,395  10/1967   Muller et al. _____ 260—308

FOREIGN PATENTS 175,054   9/1965   U.S.S.R. _____ 260—455

ALTON D. ROLLINS, Primary Examiner

U.S. Cl. X.R.

260—299; 424—269